US008019155B2

(12) United States Patent
Hibino et al.

(10) Patent No.: US 8,019,155 B2
(45) Date of Patent: Sep. 13, 2011

(54) DIGITAL OBJECT INFORMATION VIA CATEGORY-BASED HISTOGRAMS

(75) Inventors: Stacie L. Hibino, San Jose, CA (US); Mark D. Wood, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1150 days.

(21) Appl. No.: 11/690,994

(22) Filed: Mar. 26, 2007

(65) Prior Publication Data

US 2008/0240560 A1 Oct. 2, 2008

(51) Int. Cl.
*G06K 9/00* (2006.01)
(52) U.S. Cl. ..................................... 382/168
(58) Field of Classification Search .............. 382/168, 382/305; 715/764, 838
See application file for complete search history.

(56) References Cited

U.S. PATENT DOCUMENTS

| | | | |
|---|---|---|---|
| 5,793,888 A | 8/1998 | Delanoy | 382/219 |
| 6,351,556 B1 | 2/2002 | Loui et al. | 382/164 |
| 6,606,411 B1 | 8/2003 | Loui et al. | 382/224 |
| 6,721,454 B1 | 4/2004 | Qian et al. | 382/224 |
| 6,782,394 B1 | 8/2004 | Landeck et al. | 707/104.1 |
| 6,950,989 B2 | 9/2005 | Rosenzweig et al. | 715/721 |
| 6,996,782 B2 | 2/2006 | Parker et al. | 715/764 |
| 7,788,592 B2 * | 8/2010 | Williams et al. | 715/764 |
| 2002/0184196 A1 | 12/2002 | Lehmeier et al. | 707/3 |
| 2003/0009493 A1 | 1/2003 | Parker et al. | |
| 2003/0103065 A1 | 6/2003 | Masera et al. | 345/660 |
| 2003/0103247 A1 | 6/2003 | Masera et al. | 358/453 |
| 2004/0125150 A1 | 7/2004 | Adcock et al. | |
| 2004/0167925 A1 | 8/2004 | Visharam et al. | 707/104.1 |
| 2004/0202349 A1 | 10/2004 | Erol et al. | 382/100 |
| 2005/0076031 A1 | 4/2005 | Xu et al. | 707/9 |
| 2005/0117031 A1 | 6/2005 | Russon et al. | 348/231.2 |

FOREIGN PATENT DOCUMENTS

| | | |
|---|---|---|
| WO | 02/057959 | 7/2002 |
| WO | WO 2004/088664 | 10/2004 |

OTHER PUBLICATIONS

Published in CHI 2005 Extended Abstracts, NY: ACM Press.
Mondrian v1.0, beta 3 (released Oct. 31, 2006)—interactive statistics software for data analysis; see: http://stats.math.uni-augsburg.de/Mondrian/Mondrian.html.
Calendar view from Adobe Photoshop Album, v2 software; commercial product from Adobe, filed 2007.
Published in CHI 1996 Conference Proceedings, NY: ACM Press, p. 221-227.
Published in CSCW 2002 Conference Proceedings, NY: ACM Press.
Published in UIST 1998 Conference Proceedings, NY: ACM Press, p. 29-38.
Published in CHI 1994 Conference Companion, NY: ACM Press.
Picasa (v.1) software for photo organization; product of Google, filed 2007.

(Continued)

*Primary Examiner* — Phuoc Tran
(74) *Attorney, Agent, or Firm* — Justin D. Petruzzelli

(57) ABSTRACT

Embodiments of the present invention relate to an effective method of representing a set of digital objects across at least two category-based dimensions for facilitating efficient access to such objects. These digital objects are typically media objects such as digital image files, digital video clips, digital audio objects, such as "MP3" files, or other digital documents that can be collected by a user and distributed over a variety of storage media and storage locations.

24 Claims, 15 Drawing Sheets

OTHER PUBLICATIONS

Published in Joint Conference on Digital Libraries (JCDL) 2002 Conference Proceedings, NY: ACM Press, p. 326-335.
Published in Joint Conference on Digital Libraries (JCDL) 2004 Conference Proceedings, NY: ACM Press, p. 325-333.
Picasa (v.2) software for photo organization—product of Google, filed 2007. Adobe Photoshop Album (v.2) software for photo organization—product of Adobe, filed 2007. Nokia Lifeblog: software for photo and text viewing by time—product of Nokia, filed 2007.
Microsoft TimeQuilt—published in CHI 2005 Extended Abstracts, NY: ACM Press, p. 1937-1940.
University of Maryland project (active 1999-2003); see: http://www.cs.umd.edu/hcil/photolib/.

* cited by examiner

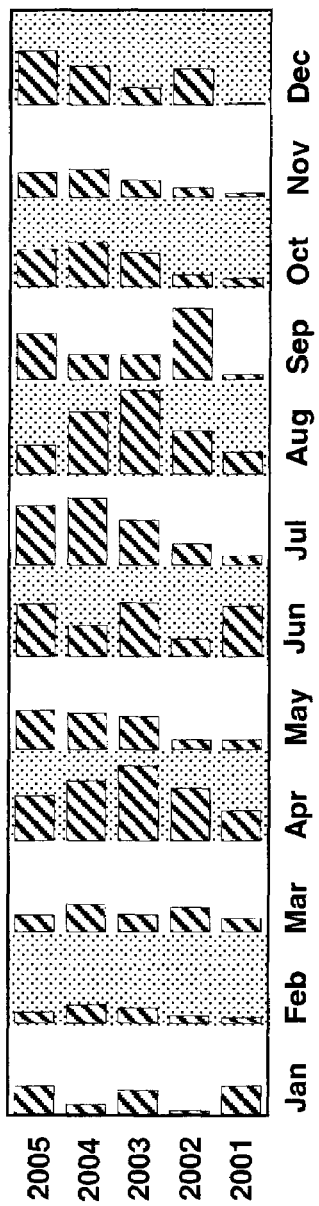
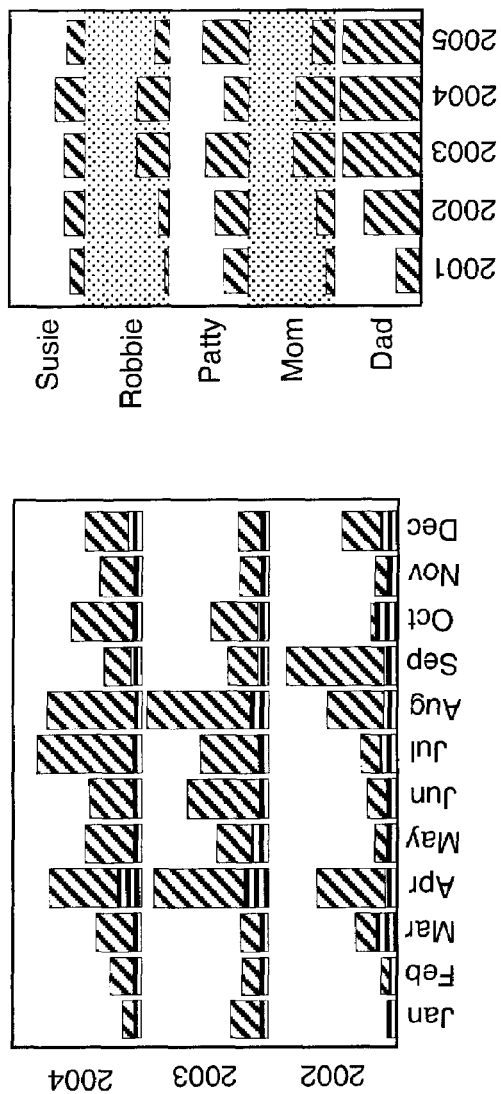
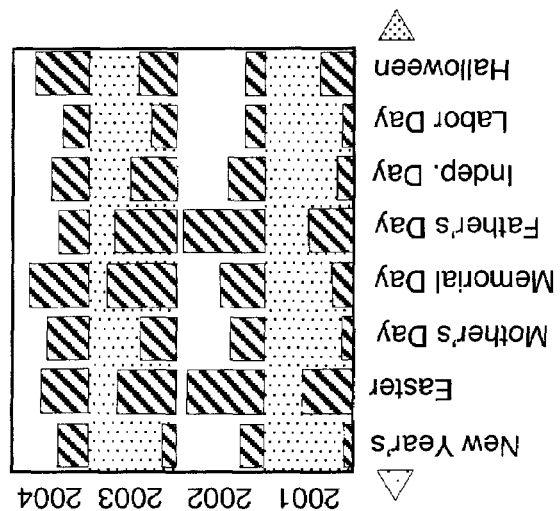
FIG. 9
FIG. 11
FIG. 10
FIG. 8

DIGITAL OBJECT INFORMATION VIA CATEGORY-BASED HISTOGRAMS

FIELD OF THE INVENTION

The present invention relates to providing information pertaining to digital objects. In particular, the present invention pertains to the formation and display of time-period based and other category-based histograms that convey information pertaining to digital objects.

BACKGROUND OF THE INVENTION

Increased computer usage and creation of digital objects along with decreasing costs in removable memory, fixed hard disks, and network access have all contributed to the increase in the number of digital objects any individual person may own or want to access. Computer users have moved from tens or hundreds of files to thousands of files or more. Similarly, digital cameras have decreased in physical carrying size and increased in memory capacity, making it easy for users to carry cameras with them more often and capture more pictures and video clips per picture-taking opportunity. As personal digital media collections increase in magnitude, they are also becoming more and more cumbersome for users to manage and access.

Typically, as in a file system or email system, users can easily view digital objects in forward or reverse chronological order by listing them. Some temporal cluster representations have begun to emerge, but thus far, such clusters are typically limited to text- or tree-based representations, calendar-based representations, or they are visual representations that require large amounts of screen real estate. Accordingly, a need in the art exists for an improved way to review and organize digital objects.

SUMMARY

The above-described problem is addressed and a technical solution is achieved in the art by a system and a method for providing information pertaining to digital object, according to the present invention. In an embodiment of the present invention, information pertaining to digital objects is provided by a method including the steps of receiving information defining a first category, which may be a time period or other category, such as a subject identifiable in a digital object or an event associable with a digital object. The method, according to this embodiment, also includes receiving information identifying at least two instances of the first category, which in the case of a year-category, the instances may be particular years. In addition, the method according to this embodiment includes receiving information defining subdivisions of the first category. The subdivisions may be associated with a second category, which may be a time period or other category, such as an identifiable subject or event. In the case of an identifiable-subject-based second category, the subdivisions may be particular people identifiable in digital objects. In this regard, the method according to this embodiment also includes identifying groups of the digital objects, each group being associated with one of the instances of the first category and one of the subdivisions. Further in this regard, the method may include displaying a histogram for each instance of the first category, each histogram having a first axis corresponding to its instance of the first category and a second axis corresponding to the subdivisions, wherein each histogram includes representations of the groups of digital objects corresponding to its instance of the first category, each representation corresponding to a group and a subdivision. For example, if the first category is year-based and the subdivisions are associated with people, each representation may illustrate the number of digital objects captured in a particular year containing a particular person.

Such multi-dimensional histograms, according to various embodiments of the present invention, provide a compact visual summary of a set of digital objects over time, emphasizes extremities in the data (e.g., time periods with very high or very low numbers of digital objects), simplifies access to periodic data, and highlights the relevant portion of the bars in the multi-dimensional histogram to show trends in a subset selection in comparison to trends for the full data set.

Although the invention is not limited to the first category being a time period and the instances of the first category being instances of time periods, the remainder of this summary and many of the examples used herein refer to a first category being a time period and the instances of the first category being time periods for purposes of clarity.

According to embodiments of the present invention, each of the subdivisions is associated with a portion or a sub-time period of its corresponding time period instance. Although not required, such portions may represent equal or substantially equal durations. For example, if the time period is a year, and the instances of the time period are particular years, the subdivisions may be months, which are substantially equal in duration. In these cases, a user is able to clearly and quickly determine how many digital objects were generated in the same month, December, for example, over the particular years. Alternatively, the subdivisions may be associated with an event, such as a holiday or a birthday. In these cases, a user is able to clearly and quickly determine how many digital objects were generated during the same event over the particular years. Alternatively still, the subdivisions may be associated with a subject identifiable in a digital object's content, such as a person, place, or other physical object. In these cases, a user is able to clearly and quickly determine how many digital pictures, for example, were generated of their mother, for example, over the particular years.

Also according to various embodiments of the present invention, the representations of the groups of digital objects associated with each subdivision may be bars or lines whose height indicates the number of digital objects associated with its corresponding time period instance and subdivision. The heights of the bars or lines may extend in a direction perpendicular to the second axis or parallel to the second axis. By allowing flexibility in the orientation of the bars or lines, a user easily can compare the differences in the number of digital objects generated over the course of a time period instance (e.g., the year 2006) or, alternatively, easily can compare the differences in the number of digital objects generated over the course of a subdivision (e.g., the month January) across time period instances (e.g., the years 2004-2006).

According to various embodiments of the present invention, the representations may include two characteristics, one of which indicates the number of digital objects in a set of digital objects associated with the respective subdivision, and the other of which indicates the number of digital objects in a subset of the set of digital objects associated with the respective subdivision. In an embodiment, the subset of the set of digital objects may be only those digital objects in the set of digital objects meeting one or more user-defined query parameters. For example, a user may want to know how many of all the digital objects illustrated in the histograms pertain to the user's son. In this example, the representations (e.g., lines or bars) each may have two characteristics (e.g., two different colors), where one characteristic illustrates the total number of all of the digital objects in the particular time period instance and subdivision, and the other characteristic illustrates the number of digital objects in the particular time period instance and subdivision that pertain to the user's son.

Also according to various embodiments of the present invention, the first axis and the second axis of the histograms may have equal or substantially equal length. However, the first axis of each histogram may have a length determined at least by a maximum number of digital objects associated with any one of the histogram's subdivisions. If the histograms are oriented differently, the second axis of each histogram may have a length determined at least by a maximum number of digital objects associated with any one of the histogram's subdivisions. By having histograms of flexible size, wide variations in the quantities of digital objects represented by the histograms can be effectively accommodated.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which:

FIG. 8 is a depiction of a holiday-year MD histogram in accordance with an embodiment of the present invention;

FIG. 9 is a depiction of a MD histogram created using horizontal (rather than vertical) frequency bars in accordance with an embodiment of the present invention;

FIG. 10 is a depiction of a MD histogram where query results are highlighted within the context of a current set of digital objects in accordance with an embodiment of the present invention;

FIG. 11 is a depiction of year-person MD histogram in accordance with an embodiment of the present invention.

Figure 1:
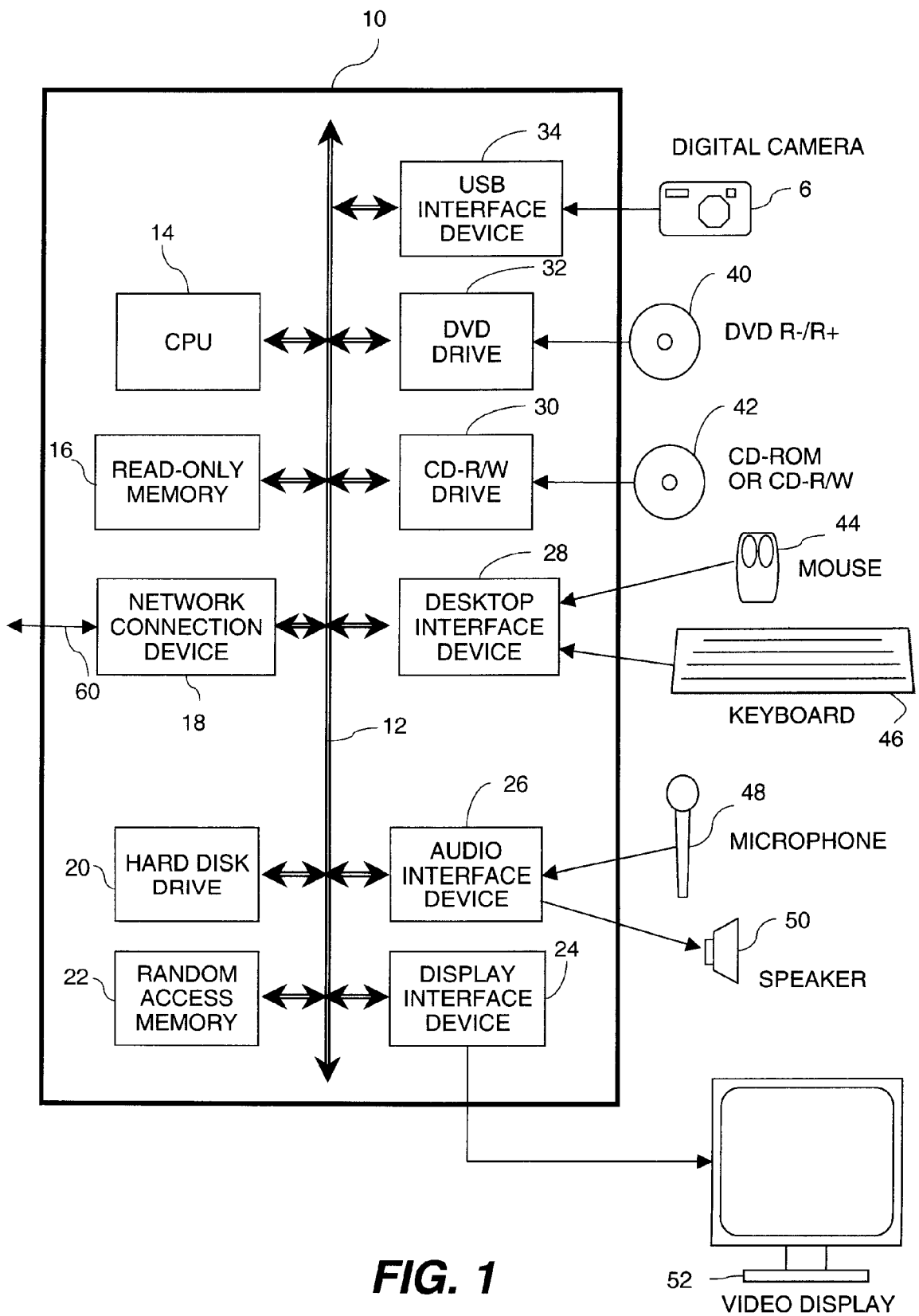
FIG. 1 is a block diagram of a system for practicing various embodiments of the present invention.

It is to be understood that the attached drawings are for purposes of illustrating the concepts of the invention and may not be to scale.

DETAILED DESCRIPTION

Embodiments of the present invention relate to an effective method of representing a set of digital objects across at least two dimensions, at least one of which is time, and for facilitating efficient access to such objects through the selection of individual time periods or cross sections of time. These digital objects are typically media objects such as digital image files, digital video clips, digital audio objects, such as "MP3" files, or other digital documents that can be collected by a user and distributed over a variety of storage media and storage locations.

Digital objects typically have a timestamp associated with them and users typically associate personal visual media such as images and video clips with a specific date or event. More specifically, users typically, though not necessarily, associate images and video clips related to personal memories with the date or event on which they were captured. Since users typically associate objects from their personal media collection with a date, it may be natural for them to want to organize and access their media by date.

When users only have a small number of digital objects distributed over a short time frame, simple one-dimensional thumbnail-based timeline distributions or one-dimensional histograms may be sufficient for summarizing and accessing their digital objects. The advantage of such visual summaries and access methods is that they provide a representation that may be familiar to users. Users understand the basics of timelines and seeing objects plotted over time. Unfortunately, when users' collections grow to thousands of objects over multiple years, these simple visual summaries and access methods can become cumbersome. Limited screen real estate makes it impossible to plot thousands of thumbnails at once. Although one-dimensional histograms help to summarize the number of objects over time, they do not support users in accessing or viewing trends over slices of time. For example, if users were interested in accessing "Christmas over all the years", they would have to select each December of each year individually. In accordance with an embodiment of the present invention, a more compact and efficient representation is to build an interactive multi-dimensional histogram in which at least a) the number of objects associated with each multi-dimensional interval may be represented in a graphical form such as stacked bar charts (e.g., see FIG. 2) and b) users may interact with the histogram to access corresponding digital objects. More specifically, a multi-dimensional histogram generated in accordance with embodiments of the present invention indicates the number of digital objects corresponding to predetermined time periods, events, or subjects. Users may select one or more time periods from the multi-dimensional histogram to access the visual thumbnail representations corresponding to the digital objects related to the selected time periods.

FIG. 1 shows one type of system for practicing an embodiment of the present invention. In this example, the system includes a computer 10, which typically includes a keyboard 46 and mouse 44 as input devices communicatively connected to the computer's desktop interface device 28. The term "computer" is intended to include any data processing device, such as a desktop computer, a laptop computer, a mainframe computer, a personal digital assistant, a Blackberry, and/or any other device for processing data, and/or managing data, and/or handling data, whether implemented with electrical and/or magnetic and/or optical and/or biological components, and/or otherwise. The phrase "communicatively connected" is intended to include any type of connection, whether wired, wireless, or both, between devices, and/or computers, and/or programs in which data may be communicated. Further, the phrase "communicatively connected" is intended to include a connection between devices and/or programs within a single computer, a connection between devices and/or programs located in different computers, and a connection between or within devices not located in computers at all.

Output to the computer 10 is typically presented on a video display 52, which may be communicatively connected to the computer 10 via the display interface device 24. Internally, the computer 10 contains components such as a CPU 14 and computer-accessible memories, such as read-only memory 16, random access memory 22, and a hard disk drive 20, which may retain some or all of the digital objects referred to herein. The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, ROMs, and RAMs.

The CPU 14 communicates with other devices over a data bus 12. The CPU 14 executes software stored on a hard disk drive 20. In addition to fixed media such as a hard disk drive 20, the computer 10 may also contain computer-accessible memory drives for reading and writing data from removable computer-accessible memories. This may include a CD-RW drive 30 for reading and writing various CD media 42 as well as a DVD drive 32 for reading and writing to various DVD media 40. Audio can be input into the computer 10 through a microphone 48 communicatively connected to an audio interface device 26. Audio playback can be heard via a speaker 50 also communicatively connected to an audio interface device 26. A digital camera 6 or other image capture device can be communicatively connected to the computer 10 through, for example, the USB interface device 34 to transfer digital objects from the camera 6 to the computer's hard disk drive 20 and vice-versa. Finally, the computer 10 can be communicatively connected to an external network 60 via a network connection device 18, thus allowing the computer to access digital objects from other computers, devices, or data-storage systems communicatively connected to the network. A "data-storage system" may include one or more computer-accessible memories, and may be a distributed data-storage system including multiple computer-accessible memories communicatively connected via a plurality of computers and/or devices. On the other hand, a data storage system need not be a distributed data-storage system and, consequently, may include one or more computer-accessible memories located within a single computer or device.

A collection of digital objects can reside exclusively on the hard disk drive 20, compact disc 42, DVD 40, or on remote data storage devices, such as a networked hard drive accessible via the network 60. A collection of digital objects can also be distributed across any or all of these storage locations.

A collection of digital objects may be represented by a database that uniquely identifies individual digital objects (e.g., such as a digital image file) and their corresponding location(s). It will be understood that these digital objects can be media objects or non-media objects. Media objects can be digital still images, such as those captured by digital cameras, audio data such as digital music or voice annotations, digital video clips with or without sound. Media objects could also include files produced by graphic or animation software such as those produced by Adobe Photoshop or Adobe Flash. Non-media objects can be text documents such as those produced by word processing software or other office-related documents such as spreadsheets or email. A database of digital objects can be comprised of only one type of object or any combination.

Once a collection of digital objects is associated together, such as in a database or by another mechanism of associating data, the objects can be abstractly represented to the user in accordance with an embodiment of the present invention. FIG. 2 shows an example of a sequence 81 of multi-dimensional (MD) histograms 83 according to an embodiment of the present invention. One axis 82 of each of the MD histograms 83 may be enumerated in instances of time periods, and the other axis 80 may be enumerated in subdivisions of those time periods. In the example of FIG. 2, the time periods are years, the instances of the time periods are the particular years 2000-2004, and the subdivisions are calendar months. In this regard, the vertical axes 82 are enumerated by calendar year and the horizontal axes 80 are enumerated by calendar month.

Also in accordance with an embodiment of the present invention, one axis of the MD histogram may be further enumerated to indicate the number of digital objects. In the embodiment of FIG. 2, each calendar year in the vertical axis 82 has been further enumerated to indicate the relative number of digital objects per subdivision. The height of any individual bar, such as bar 84, in the MD histogram indicates the relative number of digital objects occurring in the corresponding subdivision indicated by the position of the bar. For bar 84 of FIG. 2, its relative height indicates the number of digital objects occurring in December 2004. It should be noted that although FIG. 2 illustrates a bar 84 to indicate a number of digital objects, any other graphical or textual representation may be used. In this regard, although the embodiment of FIG. 2 illustrates bar graphs where each bar corresponds to a particular histogram's subdivision, continuous graphical representations, such as continuous line graphs may be used.

A subdivision in the embodiment of FIG. 2 is an interval of time over which objects associated with a date in that interval are counted together. An interval can have any duration, e.g., minutes, half-hours, hours, days, weeks, months, years, etc. Larger intervals may be constructed if, for example, the display area for the histogram is small, or if objects are sparsely distributed over smaller intervals. One skilled in the art will appreciate that the invention is not limited to any particular time intervals. In the embodiment of FIG. 2, the interval of time is a single month of a single year. It should be noted, however, that although FIG. 2 illustrates subdivisions being associated with substantially equal time intervals, precisely equal or different time intervals may be associated with the subdivisions.

Figure 2A:
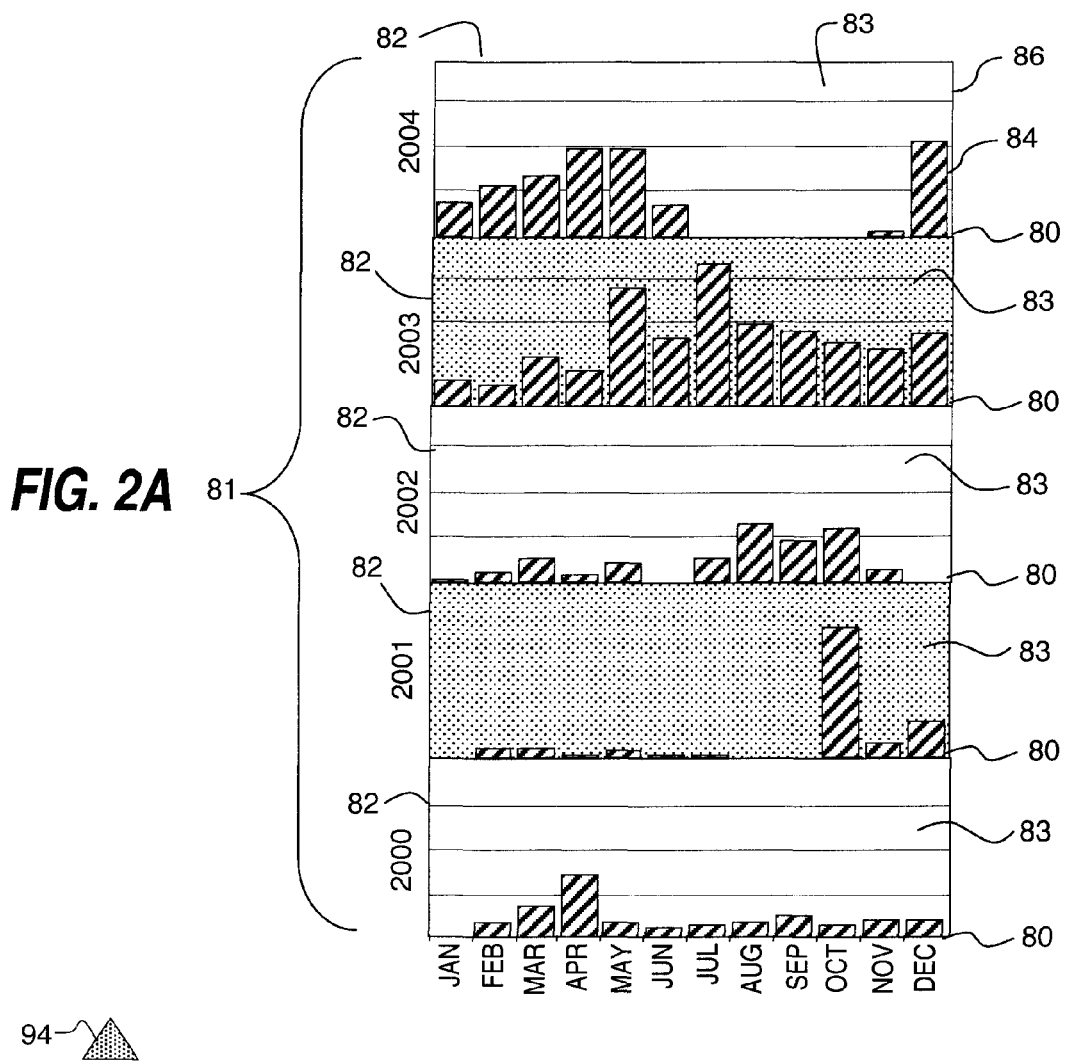
FIG. 2 presents two examples of a multi-dimensional (MD) histogram made in accordance with an embodiment of the present invention.
Figure 2B:
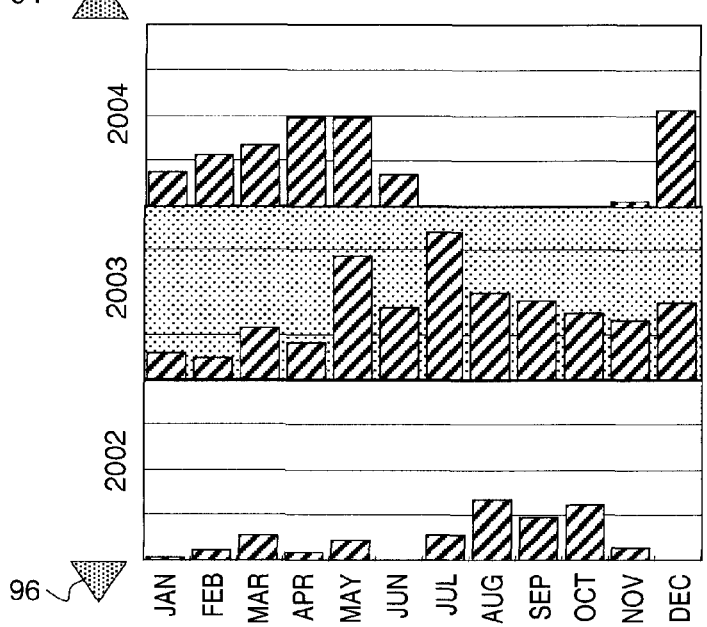

If screen real estate is limited, a portion of a sequence of MD histograms can be displayed and scrolling arrows can be provided along one or both axes of the histograms. In FIG. 2B, only a sequence of three histograms is displayed. A scroll-up arrow 94 may be provided to access histograms pertaining to year instances beyond 2004, while a scroll down arrow 96 may be provided to access years before 2002.

Figure 3:
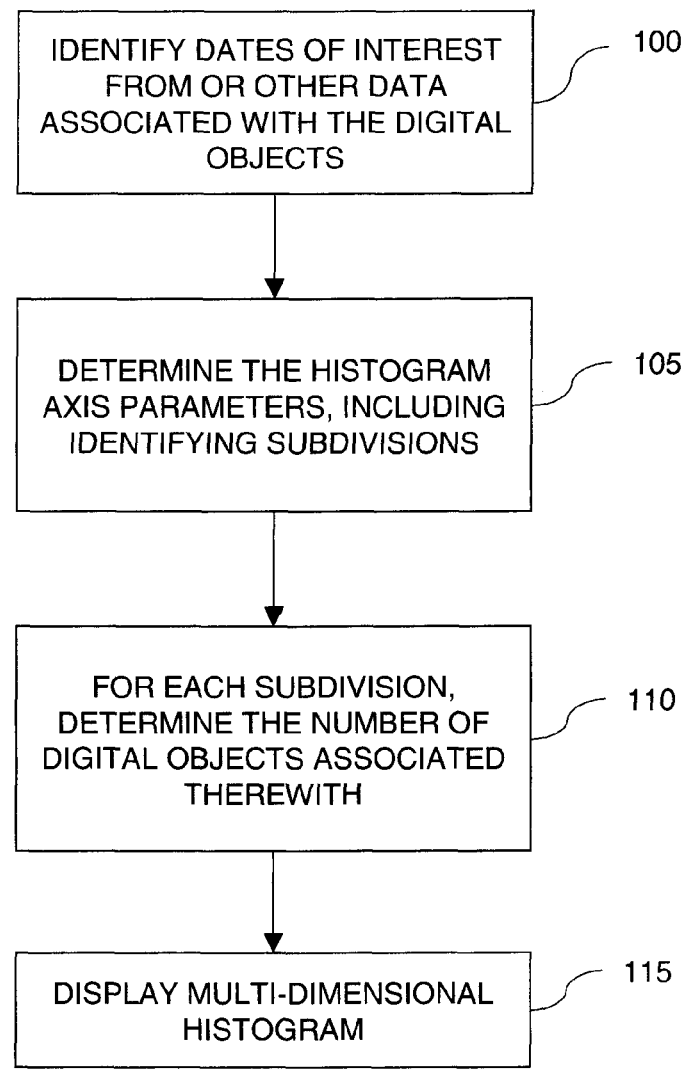
FIG. 3 is a flow diagram showing how a MD histogram, such as in FIG. 2A, can be made in accordance with an embodiment of the present invention.

FIG. 3 is a flow diagram providing details on how a sequence of MD histograms may be generated in accordance with an embodiment of the present invention. In step 100, digital object characteristics relevant to the axes of the histograms are determined. In the embodiment of FIG. 2, a date of generation or modification of each digital object is identified. In other embodiments, events or subjects associated with the digital objects also may be identified. The date of generation or modification information can be obtained from data associated with the digital objects. For example, the EXIF header, known in the art, of an image captured from a digital camera can be used to provide the capture date for an image file. Alternatively, the digital object's file creation or modification date could be used if header information was not available.

In step 105, histogram axis parameters may be determined. Histogram parameters may include information defining a time period, information identifying particular instances of the time period, and information defining subdivisions of the time period. In the embodiment of FIG. 2A, the information defining a time period specifies a year as the time period, the information identifying particular instances of the time period specifies the years 2000, 2001, 2002, 2003, and 2004 as year instances, and the information defining subdivisions of the time period specifies calendar months as the subdivisions of the year time period. In other embodiments of the present invention, the information defining subdivisions of the time period may specify subjects or events for the subdivisions, as described in more detail later, with respect at least to FIGS. 8 and 11.

In the case where the subdivisions are associated with a temporal portion of a time period (e.g., calendar months of a year time period), such time period and associated subdivisions can be independent of or dependent on the data. For example, the time period and subdivisions may be fixed to always show months along one axis and years along another axis, independent of how the data may be distributed. Alternatively, the system may analyze the data to first determine the largest granularity of time for which the data has more than one time slot and then select the next largest granularity of time for which the data has more than one time slot. For example, if there was only one month's worth of data, then it does not make sense to have a MD histogram with years and months as the axes. The system could instead use the "week number" for one axis and "day of week" for another axis.

In step 110, groups of digital objects are identified, each group being associated with one of the instances of the time period and one of the subdivisions. In other words, the number of digital objects from the collection that are associated with each time period instance vs. subdivision are determined, in order to form the MD histograms. In step 115, the MD histograms are displayed to the user via a display device.

Figure 4:
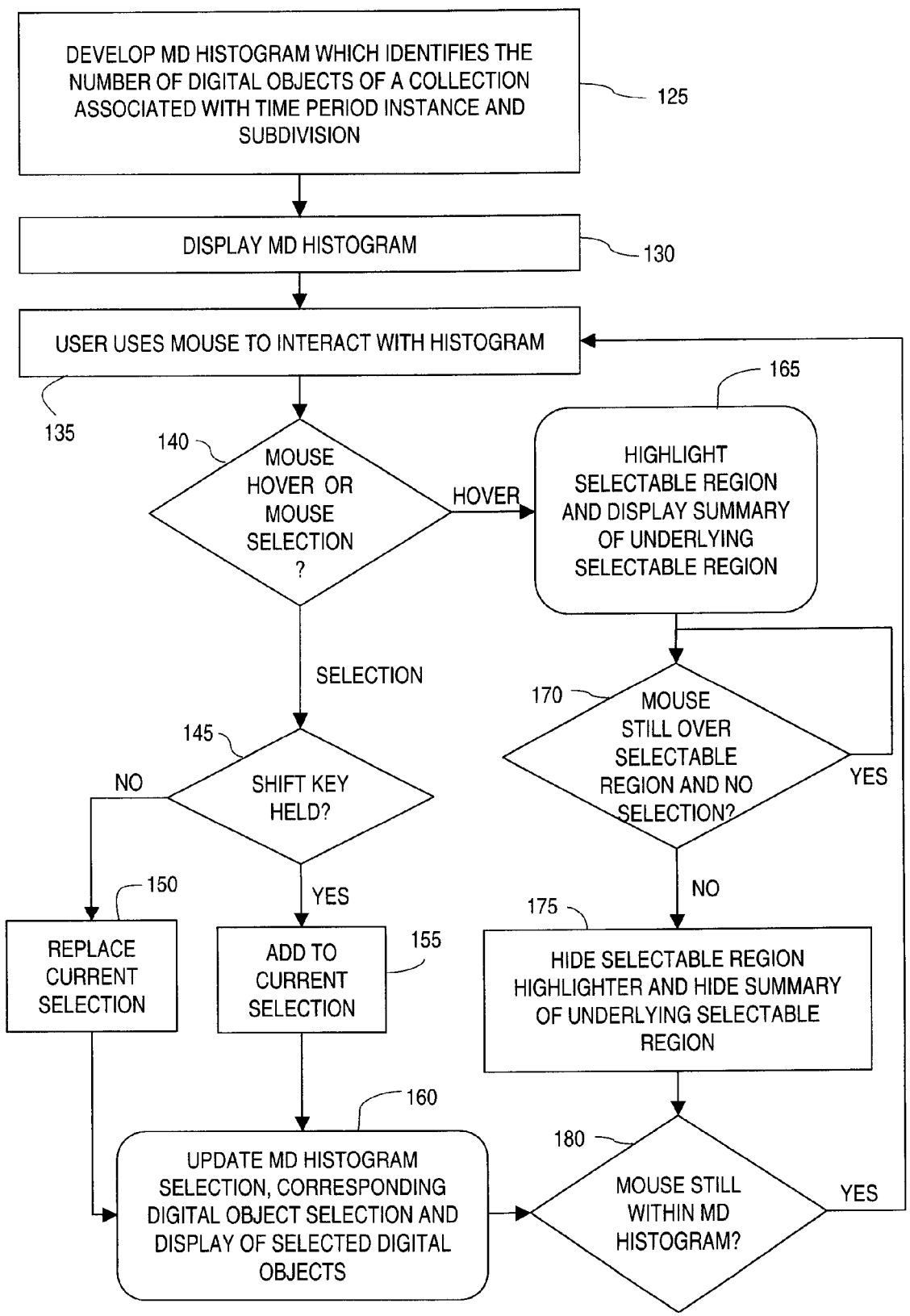
FIG. 4 is a flow diagram, in accordance with an embodiment of the present invention, showing how an interactive MD histogram, such as in FIG. 2A, can be used, describing a) how to access preview summary information of a portion of the MD histogram using mouse hovering, and b) how to select a portion of the MD histogram for displaying digital objects corresponding to such selected portion.
Figure 6A:
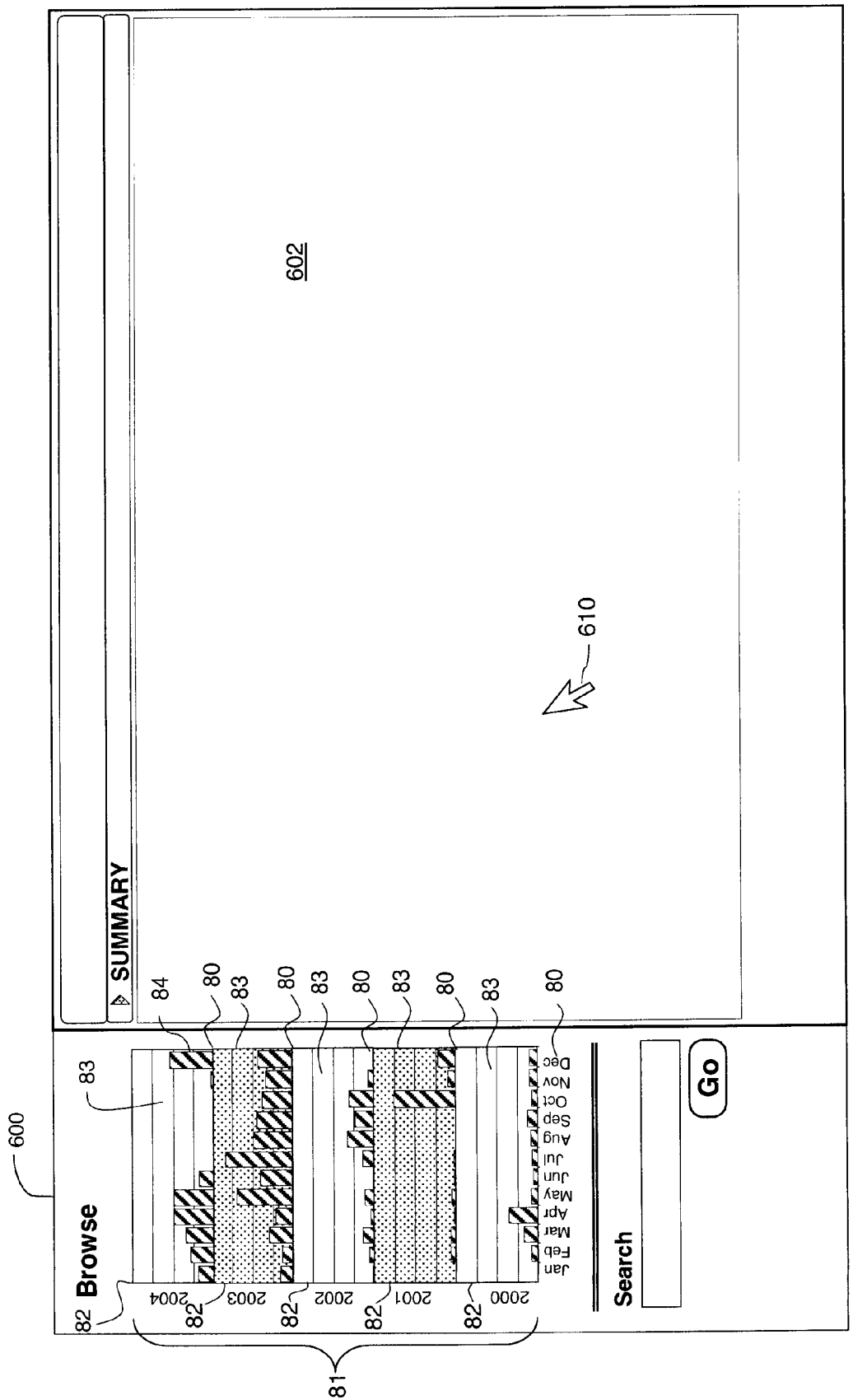
FIG. 6A is a depiction of a month-year MD histogram on a display screen in its initial state in accordance with an embodiment of the present invention.

FIG. 4 is a flow diagram illustrating how an interactive MD histogram can be used in practicing an embodiment of the present invention. In step 125, MD histograms may be formed according to the flow diagram of FIG. 3. In step 130, the MD histograms are displayed graphically to the user. For example, FIG. 6A shows an example of a sequence of month-year MD histograms displayed to the user on a display device. Region 600 denotes the area in which the MD histograms may be located. Time period instance axes 82 are displayed in FIG. 6A as the y-axes of calendar year instances, while the subdivision axes 80 are displayed in FIG. 6A as the x-axes of calendar months. Pointer 610 is controlled by a selection input device such as a mouse, joystick, or eye-tracking apparatus. The pointer 610 can be used to retrieve digital objects from a collection via making selections from the MD histogram. Iconic or thumbnail representations of such retrieved digital media objects may be displayed within region 602. The user may select one or more of the retrieved representations within region 602 to view, play, and/or process.

Figure 6B:
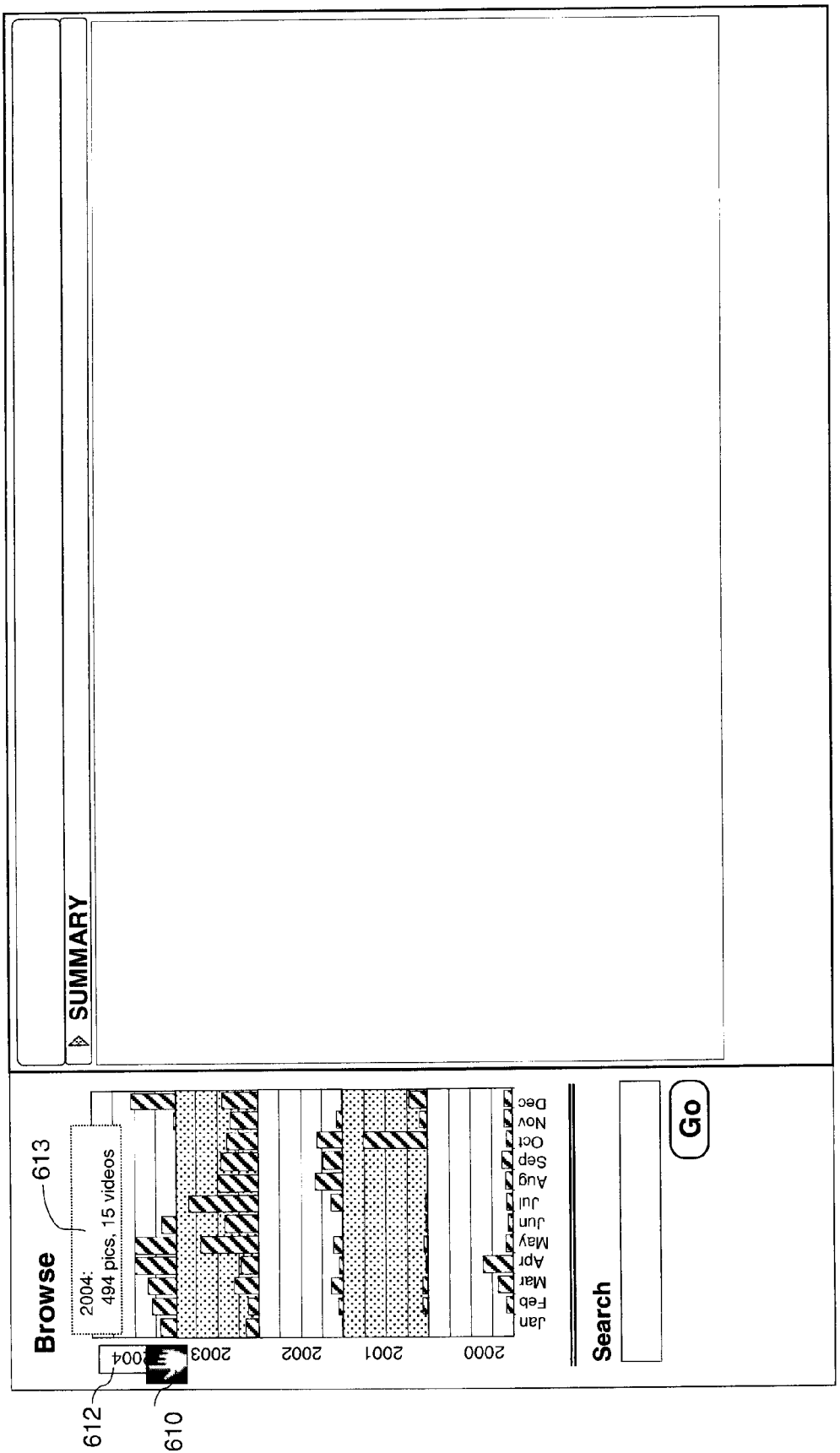
FIG. 6B is a depiction of a MD histogram when the mouse cursor hovers over a single year in accordance with an embodiment of the present invention.

Referring back to the embodiment of FIG. 4, in step 135, the user may interact with the MD histograms using an input device. In step 140, the user may either use the mouse to "hover" over (i.e., to move the mouse pointer over a specific object, but not click any buttons) or to make a selection on, some selectable region of the MD histogram. If the user simply hovers with the mouse, then in step 165, the system may respond by highlighting the area that can be selected and displaying a summary of the underlying selectable region. For example, in FIG. 6B, the mouse pointer 610 is hovering over the year 2004 of the y-axis and the system has responded with a) highlighter 612 which indicates the selectable region and b) summary information 613 displayed as overlay information. FIG. 6D, shows an example of hovering with the mouse pointer 610 on a value on the x-axis while FIG. 6F shows an example of hovering with the mouse pointer over an individual x-y bar within the main plot area of the MD-histograms.

In step 170 of the flow chart in FIG. 4, the highlighter 612 may remain displayed as long as the user keeps the mouse within the same selectable region and does not make a selection. Once the user either moves the mouse outside of the selectable region or clicks the mouse on the selectable region, then the system moves to step 175, where the highlighter 612 and summary information 613 may be hidden. In step 180, if the mouse is still within the MD histogram, then the system may loop back to step 135. If the user moves the mouse to hover over a different region, then the system may move through steps 140 and 165 to display the new highlighter and summary information. If the user makes a selection on one of the MD histograms, then the system may move from step 140 to 145. Step 145 may use the "shift" keyboard key, known in the art, as a modifier that would enable the user to add a new selection to the current selection in step 155 or replace the current selection with the new selection in step 150. Independent of whether the new selection is used to replace or add to the current selection, the system may move to step 160. In step 160, the following may be updated: a) the MD histograms may be updated to correspond to the selection made; b) the selection of underlying digital objects corresponding to the MD histogram selections may be updated; c) the display area 602 may be updated to indicate the corresponding individual digital objects that were selected.

Figure 6C:
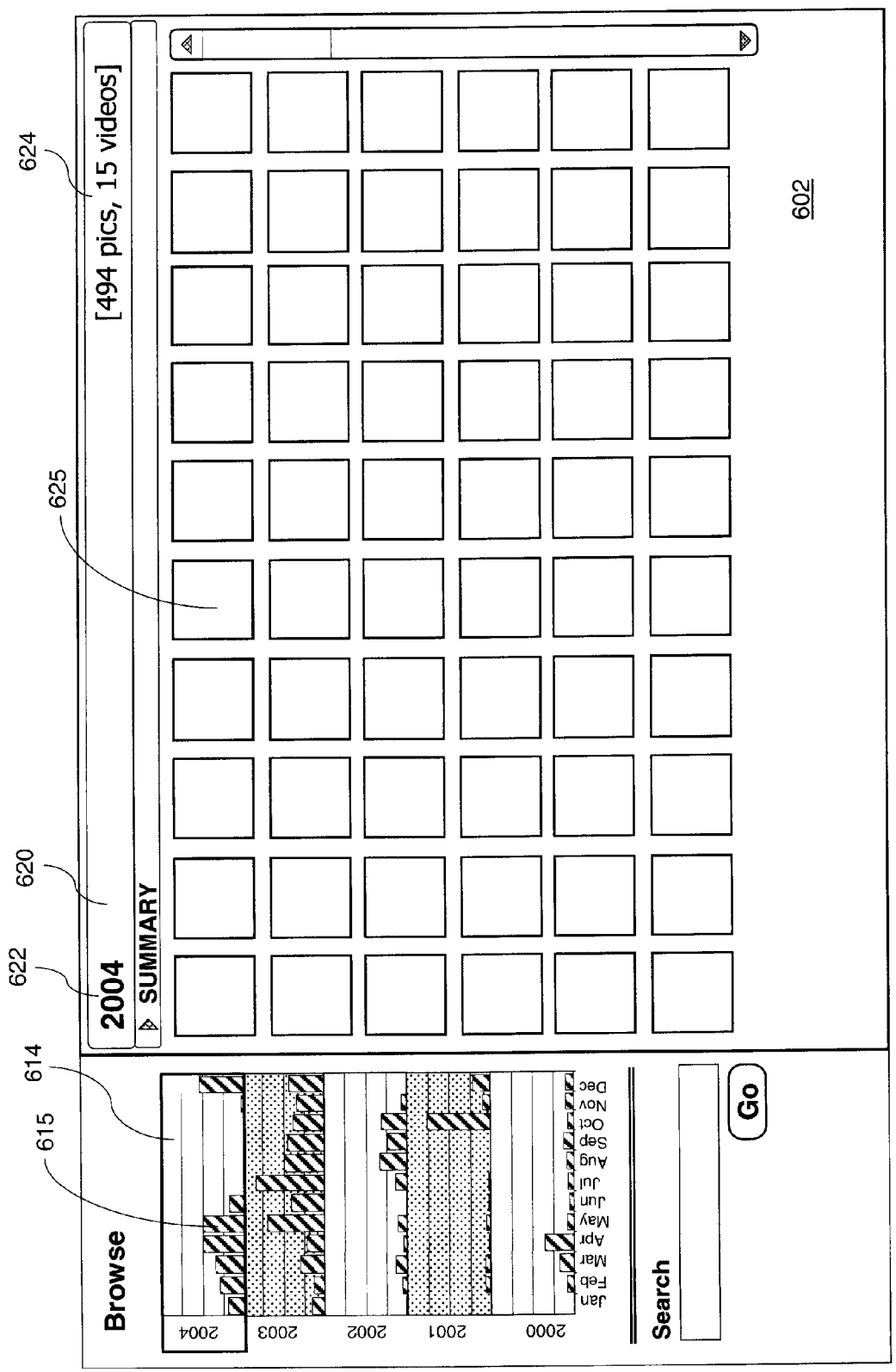
FIG. 6C is a depiction of a MD histogram and thumbnail representation of selected items on a display screen after selection of the year being hovered in FIG. 6B in accordance with an embodiment of the present invention.
Figure 6D:
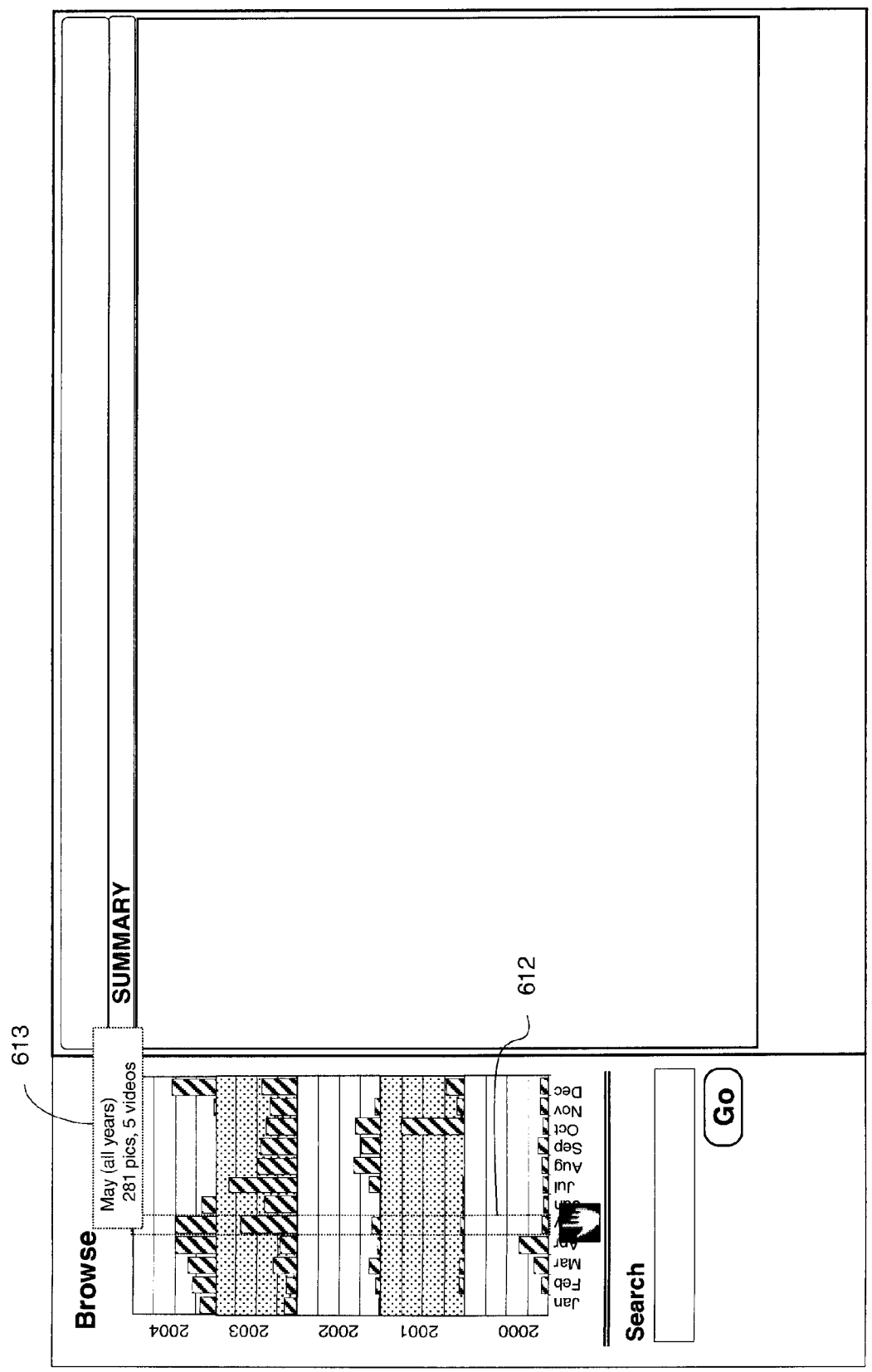
FIG. 6D is a depiction of a MD histogram when the mouse cursor hovers over a single month in accordance with an embodiment of the present invention.

Examples of user selection of different regions of the MD histograms are provided in FIGS. 6C, 6E, 6G and 6H. FIG. 6C shows the selection of the histogram corresponding to the year instance 2004 from the vertical axis of the corresponding MD histogram. Individual bars, such as bar 615, may be highlighted with a designated selection color, and the background 614 of the selected histogram may be highlighted to emphasize that the user made the selection on this histogram's vertical axis.

Figure 6E:
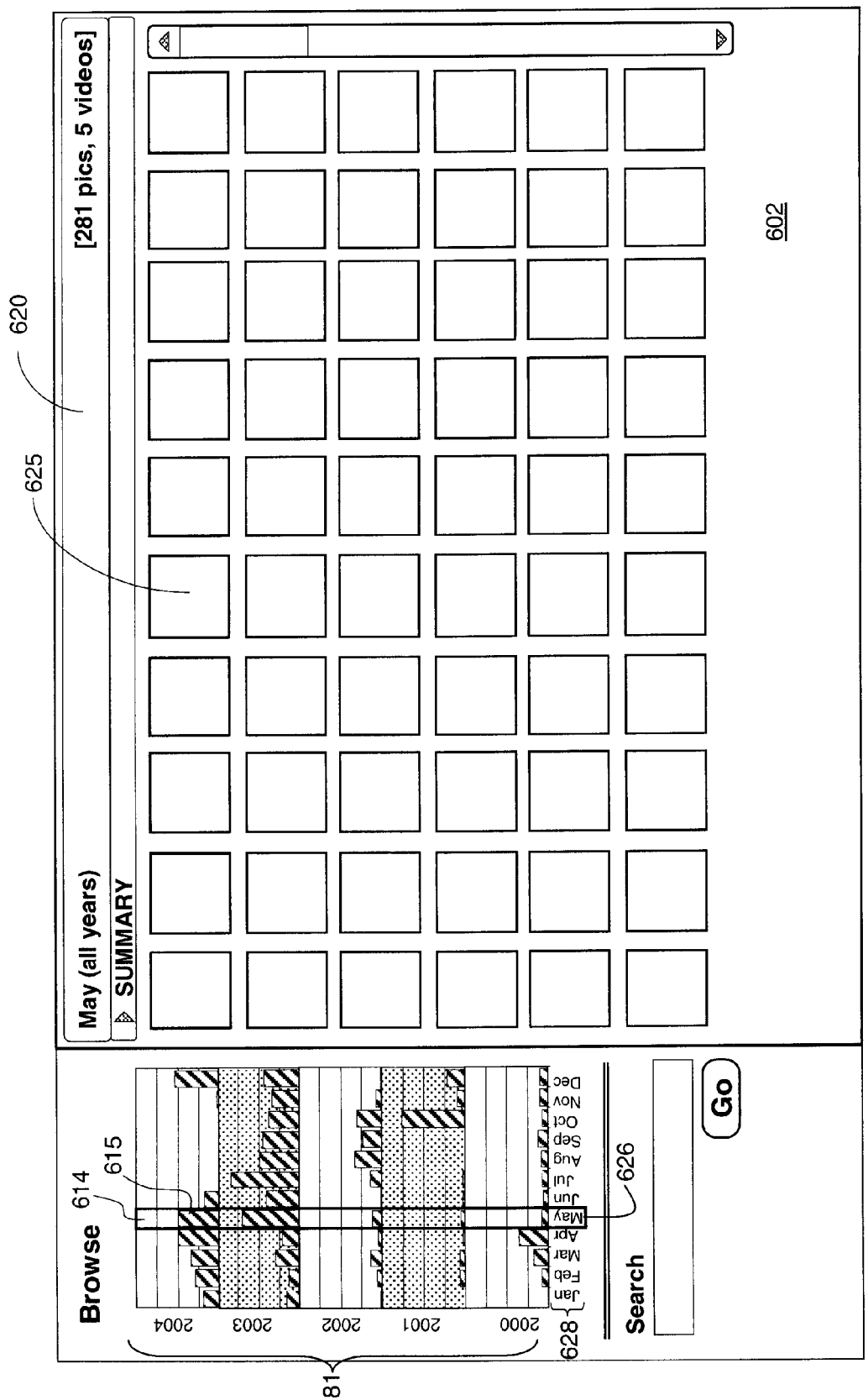
FIG. 6E is a depiction of a MD histogram and thumbnail representation of selected items on a display screen after selection of the month being hovered in FIG. 6D in accordance with an embodiment of the present invention.
Figure 6F:
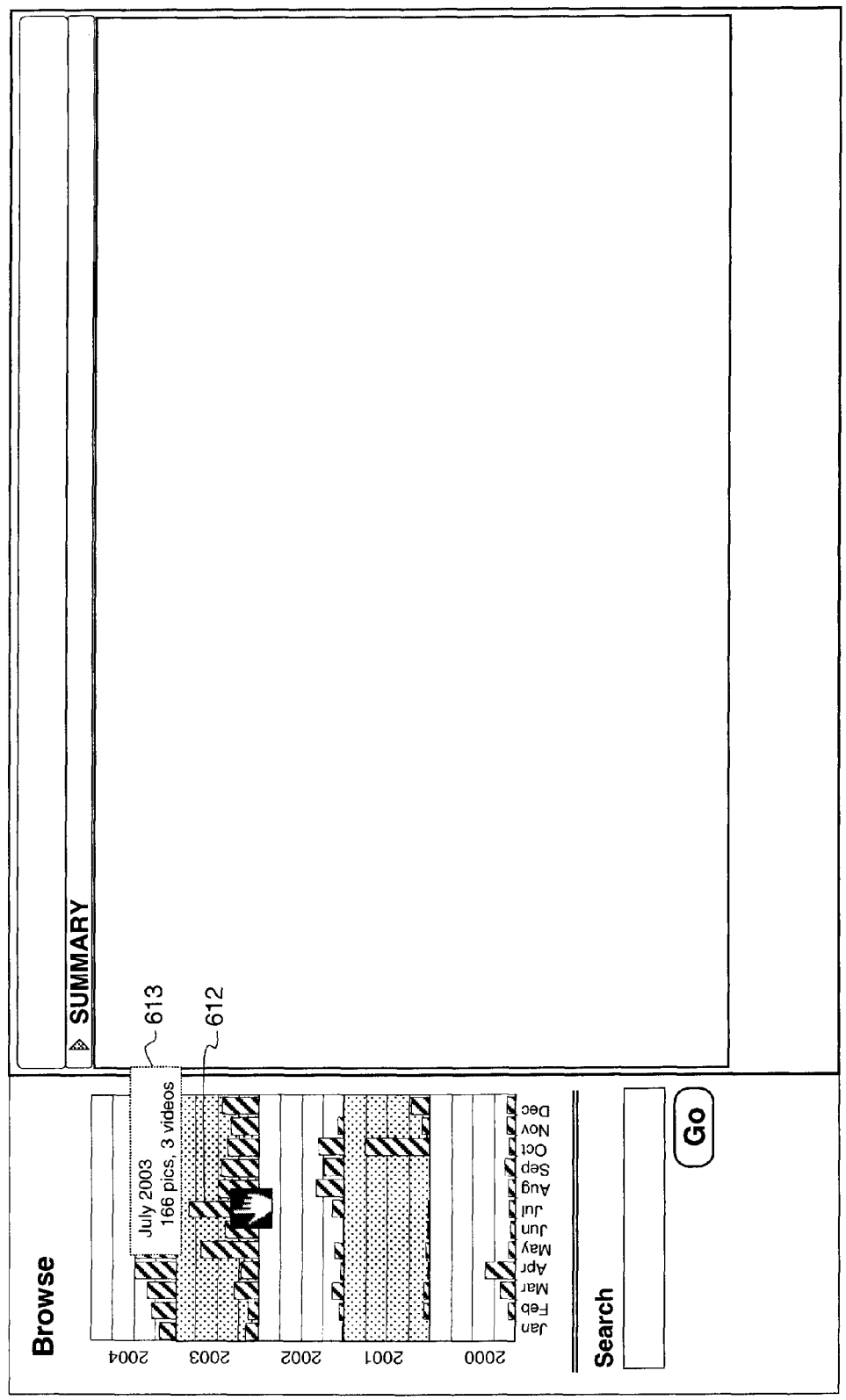
FIG. 6F is a depiction of a MD histogram when the mouse cursor hovers over a single month-year bar of the MD histogram in accordance with an embodiment of the present invention.
Figure 6G:
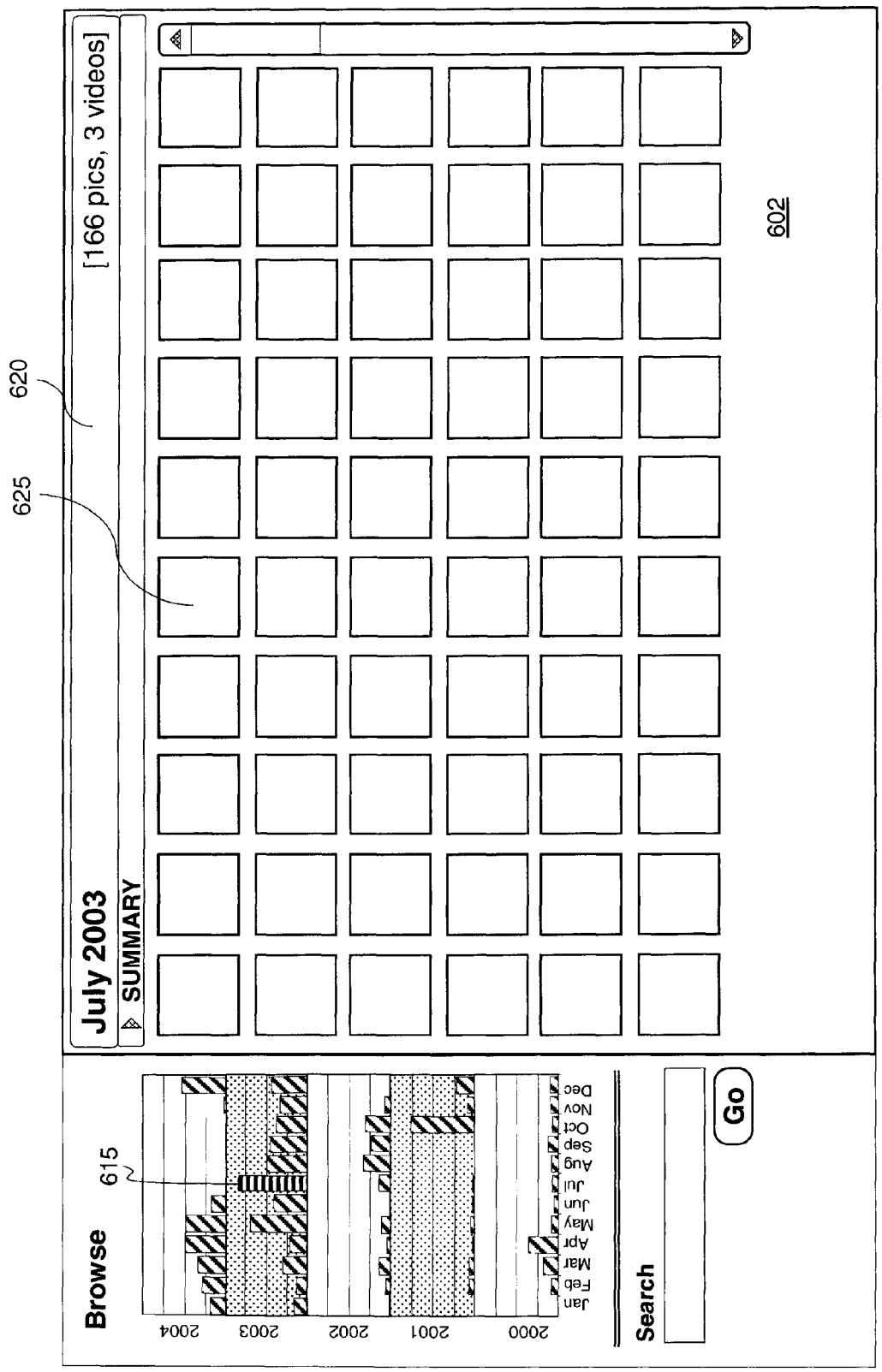
FIG. 6G is a depiction of a MD histogram and thumbnail representation of selected items on a display screen after selection of the month-year bar being hovered in FIG. 6F in accordance with an embodiment of the present invention.
Figure 6H:
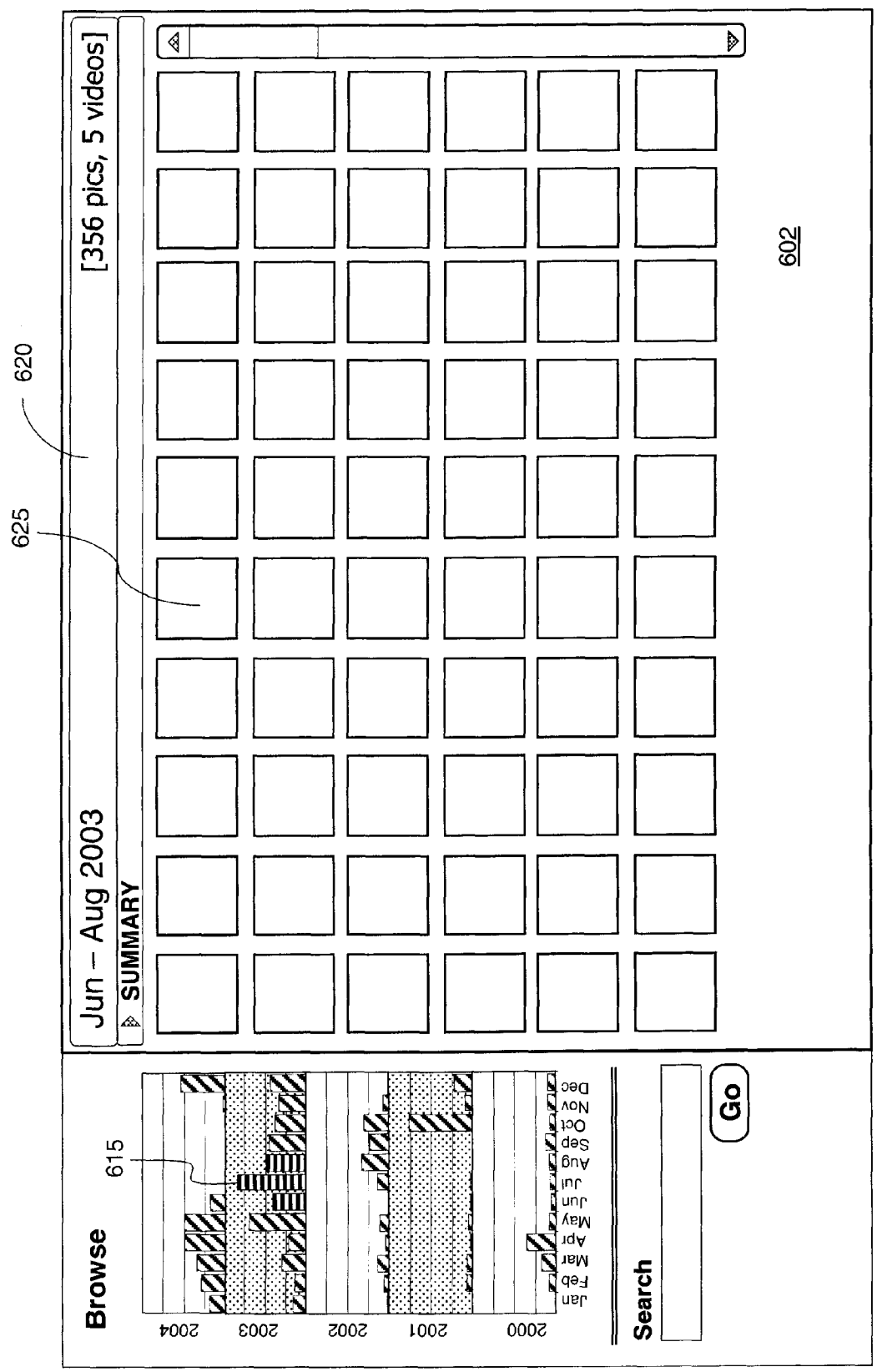
FIG. 6H is a depiction of a MD histogram and thumbnail representation of selected items on a display screen after a click-and-drag rectangular selection of the month-year bars that are highlighted in accordance with an embodiment of the present invention.

Header area 620 may be configured to display results which summarizes the selection made on the left side 622 and summarizes the total number of individual digital objects selected on the right side 624. Visual representations (e.g., 625) of the corresponding digital objects selected are displayed in area 602. Such visual representations 625 can be, for example, a thumbnail representation of a digital image or digital document, a thumbnail frame for a video clip, an icon etc. FIG. 6E shows a sample selection of a month subdivision 626 from the horizontal subdivision axis 628 of a bottom-most MD histogram. Such an action may cause selection of corresponding subdivisions of one or more others of the sequence of histograms 81. Consequently, the selected subdivisions of multiple MD histograms may be highlighted (614 and 615) to reflect the selection, and results of the selection may be presented in areas 620 and 602, with individual digital objects visually represented 625. FIG. 6G shows an example of the results of selecting (and resulting highlighting of) an individual bar or subdivision from a particular MD histogram. FIG. 6H shows an example of the results of selecting a group of bars or subdivisions from a particular histogram and the resulting highlighting us such group.

Referring back to FIG. 4, the user can continue to use the mouse (or other pointing and selection device) to review summary information resulting from mouse hovering or other interaction, to select individual time period instances or subdivisions of digital objects, and to review the retrieved results. The user may select one or more of the retrieved representations 625 within region 602 of FIG. 6 to view, play, and/or process the corresponding digital object(s). Examples of processing include, but are not limited to: accessing an actual digital object (versus viewing a visual thumbnail representation); editing a digital object; adding tags or metadata to one or more digital objects; combining two or more digital objects into a new digital object (e.g., adding music to a set of images for a musical slide show, adding a voice narrative to a video clip, etc.); transferring digital objects to another database or collection; transferring or linking digital objects to a holding area where users can do something with the objects in the holding area at a later time (e.g., create a slide show, share objects, print objects, etc.); some other function based on the digital object type and user's desire. Processing could be accessed, for example, by double-clicking the mouse on an individual visual thumbnail representation or by selecting an action from a menu.

To further aid users in finding specific digital media, the system may separate the presented results in region 602 of FIG. 6 into groups. For example, the system could separate the results by a smaller granularity of time for a selected MD histogram or subdivision thereof. For instance, in FIG. 6C, the digital objects corresponding to the selected 2004 histogram could be grouped in area 602 by month. Other criteria that the system could use for grouping results include, but are not limited to:

grouping retrieved digital objects according to the events to which they relate, as described in commonly assigned U.S. Pat. No. 6,606,411 to Alexander C. Loui et al., and commonly assigned U.S. Pat. No. 6,351,556 to Alexander C. Loui et al;

grouping retrieved digital objects by manually- or algorithmically-derived content-based information when appropriate (e.g., such as grouping images into outdoor vs. indoor pictures, grouping images by primary color); and grouping retrieved digital objects by metadata information when appropriate (e.g., such as using global positioning satellite information stored in the EXIF header to determine location; using flash vs. no-flash information in the EXIF header to group images that were captured using or not using the flash on the camera).

Figure 5:
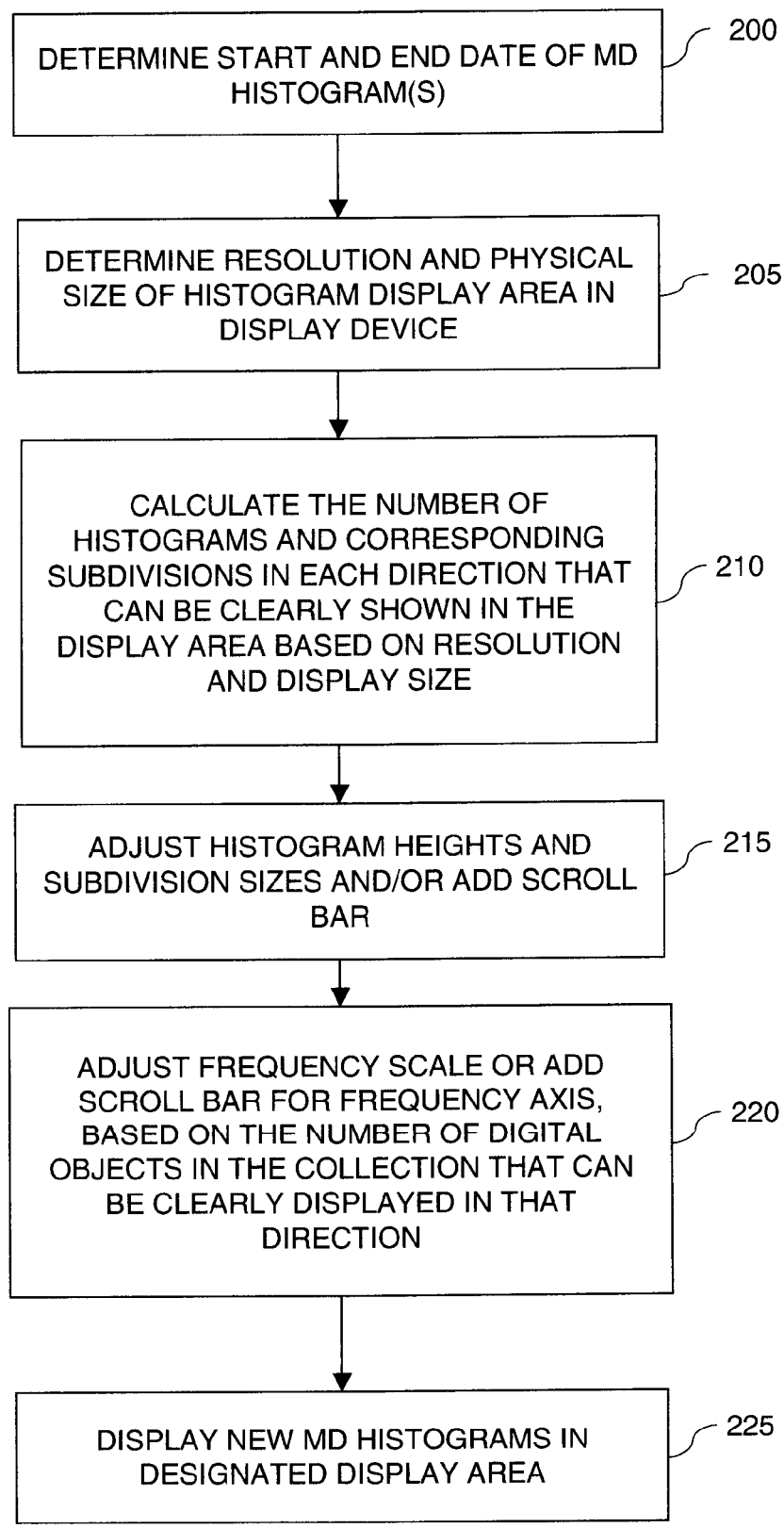
FIG. 5 is a flow diagram showing how a MD histogram can be created within a constrained display area in accordance with an embodiment of the present invention.

FIG. 5 is a flow diagram showing how MD histograms can be created within a constrained display, in accordance with an embodiment of the present invention. This can be useful for several situations, including, but not limited to: displaying the MD histogram on a portable device (e.g., digital camera, personal digital assistant or cellular telephone) with a constrained display size and constrained display resolution; displaying a MD histogram that spans several time period instances; displaying a MD histogram where the maximum frequency count varies widely from time period instance-to-time period instance (e.g., for FIG. 2, the case when the maximum frequency count varies widely from year to year).

The base MD histograms can be made using the flow diagram in FIG. 3. In order to accommodate for a constrained display area, the system may skip the step 115 of displaying the MD histograms, and may continue to step 200 of FIG. 5. In step 200, the system may determine the start and end date of the MD histogram. In step 205, the system may determine the resolution and physical size of the area available for displaying the MD histogram on the given display device. Resolution could be expressed in terms of the number of pixels of the width and height of the display area, and the physical display size can be described in terms of width and height values of the physical display expressed in inches or centimeters.

In step 210, the system may use the resolution and physical display values obtained in step 205 to calculate the number of histogram subdivisions that can be clearly shown and selected in the display area, in both directions. "Clearly shown" means that the user should be able to: differentiate one bar from any of its neighbor bars to its left, right, above or below; differentiate between when a bar is being highlighted based on hovering or highlighted from selection; abstract the basic visual histogram frequency trends; include adequate space to provide legible labels or markers for labeling or marking the axes of the MD histogram. A histogram bin area may be large enough so that it can be uniquely and easily selected by users with their given input selection device.

Figure 7:
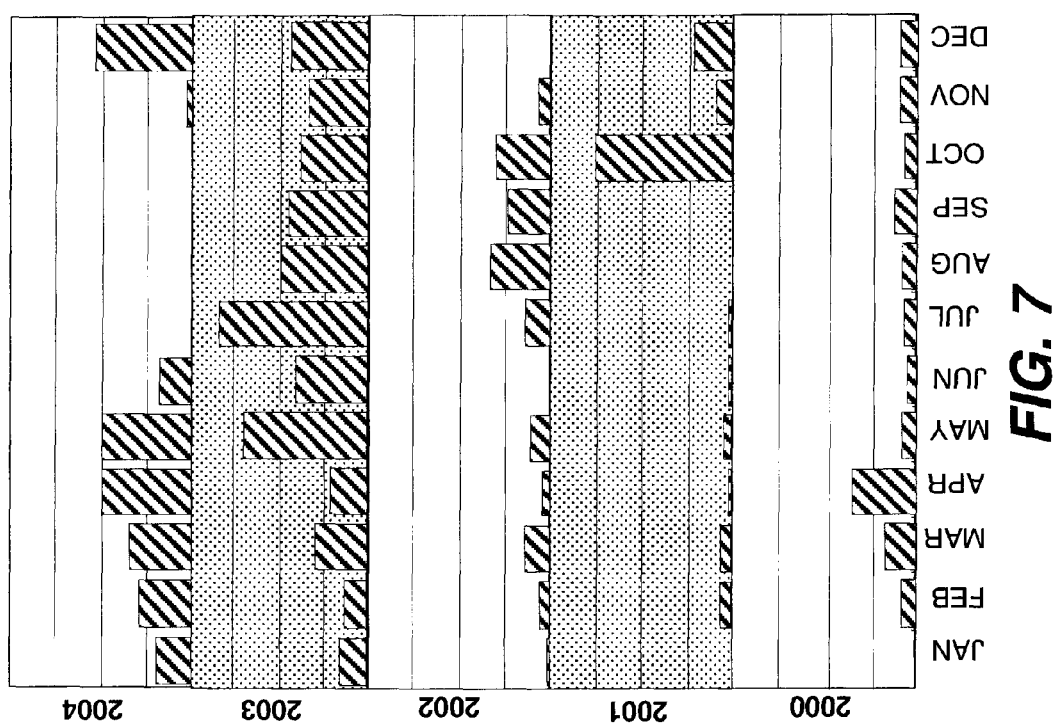
FIG. 7 is a depiction of a month-year MD histogram on a display screen in its initial state, where the height of the frequency count scale for each year may be determined by the maximum frequency count occurring during that year in accordance with an embodiment of the present invention.

Based on the values determined in steps 200 and 210, the system may adjust the subdivision size and/or add scroll arrows on the subdivision-based axis in step 215. For example, in FIG. 7, step 215 of FIG. 5 may determine: the number of months to display along the horizontal axis, the horizontal space between bars, the width of the bars to display and whether or not scroll arrows are required for the horizontal axis.

Similarly, the system may use the values determined in steps 200 and 210 to adjust the display of the frequency axis in step 220. In the example in FIG. 7, this step may affect: the height of the histograms for each year instance, the number of year instances to display along the vertical axis, and whether or not scroll arrows are required for the subdivision axis. Finally, in step 225 of FIG. 5, the new MD histograms are displayed in the designated display area.

Alternative Schemes for Defining Subdivisions

The MD histograms according to some embodiments of the present invention may be generated based on any two temporal dimensions of different scales. For example, using a Gregorian calendar and a 24-hour clock, a MD histogram may be generated using any two time intervals, such as decades, years, months, day of month, week of month, day of week, hour of day, minute of day, second of day, etc. Some temporal events, however, have temporal periodicity that may not be strictly based on a specific date or may not be aligned with Gregorian-based divisions of time. Consider United States holidays, for example. Halloween is always on October 31. Thanksgiving always occurs in November, but not on the same day in November. Easter does not occur in the same month or on the same day across several years. If MD histograms were generated using month and year as the axes, it would be relatively simple for users to access media related to Halloween over the years, but more challenging to find digital objects related to Easter over the years. To address this problem, the generation of the MD histograms may have an option to use alternative schemes for defining and naming subdivisions. For example, FIG. 8 shows a MD histogram where the user has defined the subdivision axis based on United States holidays and specified time period instances of years for the other axis. As another example, a user may choose to base the time period instances on school years, allowing users to access digital objects based on an academic calendar rather than the traditional calendar year.

In other embodiments of the invention, the subdivisions may be associated with subjects identifiable in a digital object's content, such as people, places, or other physical objects. The embodiment of FIG. 11, for example, illustrates a MD histogram having a subdivision axis, which is vertical in this example, pertaining to persons contained within the digital object collection, over the time period axis, which is horizontal in this example. To elaborate, if the digital object collection consisted of digital images, then FIG. 11 shows, for instance, the frequency distribution of images containing a specific person over the years.

Horizontal Versus Vertical Histograms

The invention is not limited to the particular orientations of the MD histograms illustrated herein. As an example of this, a sequence of histograms may be stacked horizontally or vertically. When the MD histograms are displayed as a vertical stack of histograms, it is easy for the user to visually compare and contrast the frequencies of an x-axis subdivision slots for any given y-axis time period instance. For example, the month with the most frequent number of digital objects in FIG. 2A for year=2001, is October. If the user is interested in visually comparing frequencies across a y-axis time period instance, however, it can require more careful one-by-one comparisons by the user, when vertical bars and a vertical stack of histograms are used. To address this issue, embodiments of the present invention allow users to have horizontal or vertically sequenced histograms. FIG. 9 presents an example of using horizontal bars to create the MD histograms. Note that using horizontal bars makes it easier for users to visually compare and contrast the frequencies of the y-axis time period instance axes, for any given x-axis subdivision.

Displaying Trends in a Subset Selection

In addition to providing an effective method of graphing and previewing a temporal summary of digital objects across at least two dimensions, at least one of which is time, and facilitating efficient access to such objects through the selection of individual time period instances or subdivisions, the MD histograms according to embodiments of the present invention can also be used to visually summarize a distribution of a query subset of digital objects in comparison to a set of digital objects. FIG. 10 provides an example of this. Assume that the full heights of the bars in FIG. 10 represent a collection of digital objects spanning years 2002 to 2004. If the user issued a query such as "find all digital objects containing Jane," the system may then summarize the results of the query by highlighting the proportion of the bars corresponding to the results of the query. This allows the user to visually compare the frequency distribution of the query results in comparison to the collection.

It is to be understood that the exemplary embodiments are merely illustrative of the present invention and that many variations of the above-described embodiments can be devised by one skilled in the art without departing from the scope of the invention. For example, although the figures illustrate multi-dimensional histograms, embodiments of the present invention instead include three dimensional histograms, with one axis pertaining to the time period, one axis pertaining to the subdivisions, and a third axis pertaining to the number of digital objects associated with the corresponding time period/subdivision bin. As another example, one skilled in the art will appreciate that the present invention is not limited to the specific ordering of steps illustrated in the flow charts in the figures. Further, although example embodiments of the invention often are described herein as having a multi-dimensional histogram with one time-based axis, one skilled in the art will appreciate that this need not be the case. For example, a multi-dimensional histogram may be provided with axes associated with any type of category (e.g., identifiable subject categories or event categories), regardless of whether one axis has a category that is time-based. To elaborate, a histogram may be generated with an axis based on a geographic location category, where instances of the geographic location category are particular cities, for example. Another axis, which forms the subdivisions of the geographic location axis, may be identifiable-subject based, such that each subdivision is associated with a particular person or other object, for example. Consequently, this example histogram would indicate the number of digital objects containing each person captured at a particular city. It is therefore intended that all such variations be included within the scope of the following claims and their equivalents.

PARTS LIST 6 digital camera
10 personal computer
12 data bus
14 CPU
16 read-only memory 18 network connection device
20 hard disk drive
22 random access memory
24 display interface device
26 audio interface device
28 desktop interface device
30 CD-R/W drive
32 DVD drive
34 USB interface device
40 DVD-based removable media such as DVD R− or DVD R+
42 CD-based removable media such as CD-ROM or CD-R/W
44 mouse
46 keyboard
48 microphone
50 speaker
52 video display
80 subdivision axis
81 sequence of histograms
82 time period instance axis
83 histogram
84 graphical bar
86 timeline location
94 scrollbar up button
96 scrollbar down button
100 block
105 block
110 block
115 block
125 block
130 block
135 block
140 block
145 block
150 block
155 block
160 block
165 block
170 block
175 block
180 block
200 block
205 block
210 block
215 block
220 block
225 block
600 screen region
602 screen region
610 pointer
612 highlighter
613 overlay summary information
614 background
615 individual bar of a MD histogram
620 header area
622 left side of header area
624 right side of header area
625 visual representation of a digital object
626 selected subdivision
628 subdivision axis of bottom-most histogram

What is claimed is:

1. A method for providing information pertaining to digital objects stored by one or more computer-accessible memories, the method implemented at least in part by a computer and comprising the steps of:
displaying a sequence of histograms, said histograms showing different time period instances, said histograms each subdividing a respective said time period instance into a plurality of subdivisions, said subdivisions each having a representation of a number of digital objects associated with the respective said subdivision;
during said displaying step, accepting a first user input designating one or more of said subdivisions of one of said histograms to provide designated subdivisions;
responsive to said user input, modifying said displaying to graphically emphasize said designated subdivisions and corresponding subdivisions of one or more others of said sequence of histograms; and
providing an output based on the digital objects associated with the emphasized subdivisions.

2. The method of claim 1, wherein each of the subdivisions is associated with a temporal portion of its corresponding time period instance.

3. The method of claim 1, wherein each of the subdivisions is associated with an equal or substantially equal portion of its corresponding time period instance.

4. The method of claim 1, wherein at least one of the subdivisions is associated with a larger or smaller portion of its corresponding time period instance than another subdivision.

5. The method of claim 1, wherein all of the subdivisions in a histogram account for the entire time period instance represented by the corresponding histogram.

6. The method of claim 5, wherein the time period instances are years and the subdivisions are months.

7. The method of claim 1, wherein all of the subdivisions in a histogram do not account for the entire time period instance represented by the corresponding histogram.

8. The method of claim 1, wherein each of the subdivisions is associated with an event.

9. The method of claim 8, wherein at least one of the events is a holiday or birthday.

10. The method of claim 1, wherein each of the subdivisions is associated with a subject identifiable in a digital object's content.

11. The method of claim 10, wherein at least one of the identifiable subjects is associated with a person.

12. The method of claim 10, wherein at least one of the identifiable subjects is associated with a place.

13. The method of claim 10, wherein at least one of the identifiable subjects is associated with a physical object.

14. The method of claim 1, wherein the histograms show successive time period instances.

15. The method of claim 1, wherein said modifying step graphically emphasizes corresponding subdivisions of all of said histograms.

16. The method of claim 1, wherein a first axis of each histogram pertains to a time period instance and a second axis of each histogram pertains to the subdivisions.

17. The method of claim 1, wherein the representations are bars or lines whose heights or high points indicates a number of digital objects.

18. The method of claim 16, wherein the first axes and the second axes of the histograms have equal or substantially equal length.

19. The method of claim 16, wherein the representations are bars or lines whose height indicates the number of digital objects, and wherein the heights of the bars or lines extend in a direction perpendicular to the second axis.

20. The method of claim 16, wherein the first axis of each histogram has a length determined at least by a maximum number of digital objects associated with any one of the histogram's subdivisions.

21. The method of claim 16, wherein the representations are bars or lines whose height indicates the number of digital objects, and wherein the heights of the bars or lines extend in a direction parallel to the second axis.

22. The method of claim 16, wherein the second axis of each histogram has a length determined at least by a maximum number of digital objects associated with any one of the histogram's subdivisions.

23. The method of claim 1, wherein the representations comprise two characteristics, one of which indicates the number of digital objects in a set of digital objects associated with the respective subdivision, and the other of which indicates the number of digital objects in a subset of the set of digital objects associated with the respective subdivision.

24. The method of claim 23, wherein the subset of the set of digital objects is only those digital objects in the set of digital objects meeting one or more user-defined query parameters.

* * * * *